(12) United States Patent
Hancock et al.

(10) Patent No.: US 10,384,967 B2
(45) Date of Patent: Aug. 20, 2019

(54) WATER TREATMENT SYSTEMS AND METHODS

(71) Applicant: OASYS WATER LLC, Dover, DE (US)

(72) Inventors: Nathan T. Hancock, Boston, MA (US); Marek S. Nowosielski-Slepowron, Newton, MA (US); Zachary Helm, Kennebunk, ME (US); Christopher Drover, Watertown, MA (US); George Bischoff, Waxhaw, NC (US)

(73) Assignee: OASYS WATER LLC, Dover, DE (US)

( * ) Notice: Subject to any disclaimer, the term of this patent is extended or adjusted under 35 U.S.C. 154(b) by 215 days.

(21) Appl. No.: 15/327,899

(22) PCT Filed: Jul. 23, 2015

(86) PCT No.: PCT/US2015/041813
§ 371 (c)(1),
(2) Date: Jan. 20, 2017

(87) PCT Pub. No.: WO2016/014842
PCT Pub. Date: Jan. 28, 2016

(65) Prior Publication Data
US 2017/0210656 A1    Jul. 27, 2017

Related U.S. Application Data

(60) Provisional application No. 62/037,973, filed on Aug. 15, 2014, provisional application No. 62/032,102, (Continued)

(51) Int. Cl.
*B01D 61/02* (2006.01)
*B01D 61/36* (2006.01)
(Continued)

(52) U.S. Cl.
CPC .............. *C02F 9/00* (2013.01); *B01D 61/002* (2013.01); *B01D 61/025* (2013.01); *B01D 61/48* (2013.01);
(Continued)

(58) Field of Classification Search
CPC .. B01D 61/002; B01D 61/025; B01D 61/362; B01D 61/264; B01D 61/44; B01D 61/48;
(Continued)

(56) References Cited

U.S. PATENT DOCUMENTS 2,486,691 A * 11/1949 Travers ................. C02F 1/5281
210/197
5,587,079 A * 12/1996 Rowley ..................... C02F 3/28
210/603
(Continued)

FOREIGN PATENT DOCUMENTS

WO    WO-2005121029 A1 * 12/2005    ........... B01D 63/082

OTHER PUBLICATIONS

English Language translation of WO 2005/121029 (2005) (obtained from Google Patents Dec. 2018) (Year: 2005).*

*Primary Examiner* — Lucas A Stelling
(74) *Attorney, Agent, or Firm* — Leason Ellis LLP (57) ABSTRACT

Separation processes using osmotically driven membrane systems are disclosed generally involving the extraction of solvent from a first solution to concentrate a solute by using a second concentrated solution to draw the solvent from the first solution across a semi-permeable membrane. Pre-treatment and post-treatment may also enhance the osmotically driven membrane processes.

16 Claims, 7 Drawing Sheets

Related U.S. Application Data filed on Aug. 1, 2014, provisional application No. 62/028,595, filed on Jul. 24, 2014.

(51) Int. Cl.

| | | |
|---|---|---|
| *B01D 61/44* | (2006.01) | |
| *B01D 61/48* | (2006.01) | |
| *B01D 61/58* | (2006.01) | |
| *C02F 1/42* | (2006.01) | |
| *C02F 1/44* | (2006.01) | |
| *C02F 1/469* | (2006.01) | |
| *C02F 1/463* | (2006.01) | |
| *C02F 1/52* | (2006.01) | |
| *C02F 3/34* | (2006.01) | |
| *C02F 5/02* | (2006.01) | |
| *C02F 9/00* | (2006.01) | |
| *B01D 61/00* | (2006.01) | |
| *C02F 1/00* | (2006.01) | |
| *C02F 101/10* | (2006.01) | |

(52) U.S. Cl.
CPC ............ *B01D 61/58* (2013.01); *B01D 61/362* (2013.01); *B01D 61/364* (2013.01); *B01D 61/44* (2013.01); *B01D 2311/04* (2013.01); *B01D 2311/08* (2013.01); *B01D 2311/103* (2013.01); *B01D 2311/18* (2013.01); *B01D 2311/268* (2013.01); *B01D 2311/2623* (2013.01); *B01D 2311/2649* (2013.01); *B01D 2311/2665* (2013.01); *B01D 2311/2669* (2013.01); *B01D 2311/2673* (2013.01); *B01D 2311/2688* (2013.01); *B01D 2311/2692* (2013.01); *C02F 1/42* (2013.01); *C02F 1/441* (2013.01); *C02F 1/445* (2013.01); *C02F 1/463* (2013.01); *C02F 1/4695* (2013.01); *C02F 1/52* (2013.01); *C02F 3/345* (2013.01); *C02F 5/02* (2013.01); *C02F 2001/007* (2013.01); *C02F 2101/101* (2013.01); *C02F 2209/005* (2013.01); *C02F 2209/02* (2013.01); *C02F 2209/06* (2013.01); *C02F 2209/40* (2013.01)

(58) Field of Classification Search
CPC .................... B01D 61/58; B01D 2311/04; B01D 2311/08; B01D 2311/103; B01D 2311/18; B01D 2311/2623; B01D 2311/2649; B01D 2311/2665; B01D 2311/2669; B01D 2311/2673; B01D 2311/268; B01D 2311/2688; B01D 2311/2692; C02F 1/42; C02F 1/441; C02F 1/445; C02F 1/463; C02F 1/4695; C02F 1/52; C02F 1/5281; C02F 1/529; C02F 3/345; C02F 5/02; C02F 2001/007; C02F 2101/101; C02F 2209/005; C02F 2209/02; C02F 2209/06; C02F 2209/40

See application file for complete search history.

(56) References Cited

U.S. PATENT DOCUMENTS

| | | | |
|---|---|---|---|
| 2004/0025961 A1* | 2/2004 | Beaulieu | ............ B01D 21/0012 |
| | | | 141/69 |
| 2006/0157415 A1 | 7/2006 | Koefod | |
| 2008/0135478 A1 | 6/2008 | Zuback et al. | |
| 2009/0107915 A1 | 4/2009 | Skinner et al. | |
| 2009/0211974 A1 | 8/2009 | Bonnelye et al. | |
| 2011/0000792 A1 | 1/2011 | Barber, II et al. | |
| 2012/0267307 A1* | 10/2012 | McGinnis | ............ B01D 61/002 |
| | | | 210/638 |

* cited by examiner

WATER TREATMENT SYSTEMS AND METHODS

CROSS-REFERENCE TO RELATED APPLICATIONS

This application is a U.S. national phase application and claims the benefit of priority under 35 U.S.C. § 371 of International (PCT) Patent Application Serial No. PCT/US2015/041813, titled WATER TREATMENT SYSTEMS AND METHODS and filed on Jul. 23, 2015, the contents of which are hereby incorporated herein by reference in their entireties for all purposes, and which in turn claims priority to U.S. Provisional Patent Application Ser. No. 62/028,595 filed Jul. 24, 2014, 62/032,102 filed Aug. 1, 2014, and 62/037,973 filed Aug. 15, 2014.

FIELD OF THE TECHNOLOGY

One or more aspects relate generally to water treatment systems and methods. More particularly, one or more aspects involve the use of various chemical and gravity based water treatment processes alone or in combination with osmotically driven membrane processes, such as forward osmosis to separate solutes from solutions.

SUMMARY

Aspects relate generally to various water treatment systems and methods either alone or in combination with osmotically driven membrane systems and methods, including forward osmosis separation (FO), direct osmotic concentration (DOC), pressure-assisted forward osmosis, and pressure retarded osmosis (PRO).

In one aspect, the invention relates to a water treatment system including at least one softening system configured for receiving a raw feed of the water and a two-stage clarifier in fluid communication with the at least one softening system. In some embodiments, the clarifier may be adjacent to the at least one softening system, for example, sharing a common wall with the at least one softening system or other water treatment sub-system to facilitate the overflow between sub-systems. In some embodiments, the common wall includes a diffuser plate for facilitating flow therebetween. Alternatively, the clarifier is disposed proximate the at least one softening system and/or other water treatment subsystem, such that a feed is pumped or otherwise conveyed therebetween. The two-stage clarifier includes a generally rectangular enclosure comprising two longitudinal side walls, two end walls, and a floor extending therebetween, all sealingly engaged and defining an open space therein. The clarifier also includes a first baffle extending between the side walls and upwardly from the floor for a substantial portion of a height of the side walls, where the first baffle is sealingly engaged with the side walls and floor and with one end wall defining a first settling zone; a second baffle extending between the side walls and downwardly from top edges thereof for a substantial portion of the height of the side walls, the second baffle disposed proximate to and spaced from the first baffle and defining a transition zone between the first baffle and the second baffle, a second settling zone between the second baffle and one of the end walls, and a passageway between the transition zone and the second settling zone proximate the floor. The clarifier further includes a lamella plate assembly disposed therein. In a particular embodiment, the plate assembly is disposed within the second settling zone. The size and arrangement of the plate assembly will vary to suit a particular application, but will typically extend across substantially the entire second settling zone and take up about 30% to 50% of the upper volume of the second settling zone.

In various embodiments of the foregoing aspects of the invention, the floor (or at least a portion thereof) includes at least one trough for collecting sludge or other particulate matter that settles out of the feed. The at least one trough can be located in any or all zones of the clarifier and any particular zone can include one or more troughs. The size and shape of the troughs will vary to suit a particular application. In one embodiment, the trough is pyramidal in shape and has an angle of repose of about 45 degrees to 75 degrees. The clarifier enclosure can also include a cover extending between the side walls and over at least a portion of the open space. In various embodiments, the system further includes means for introducing at least one of a chemical additive or an energy source (e.g., electrical, thermal, ultrasound, or electro-magnetic) to any one of the first settling zone, the second settling zone, and/or the transition zone. The introduction means can be located, and/or operate, in combination with the cover. In one embodiment, the introduction means includes a sacrificial electroplate disposed within the two stage clarifier for an electrocoagulation process. In some embodiments, the at least one softening system includes at least one of a lime softening system and a soda ash softening system. The water treatment system can also include a flocculation system (e.g., for polymer addition) disposed between the at least one softening system and the two stage clarifier.

In additional embodiments, the water treatment system further includes at least one osmotically driven membrane system in fluid communication with and disposed downstream of the two stage clarifier. The at least one osmotically driven membrane system can include at least one reverse osmosis (RO) unit in fluid communication with and downstream of the clarifier. Additionally or alternatively, the at least one osmotically driven membrane system includes at least one forward osmosis (FO) system in fluid communication with and disposed downstream of the clarifier. In various embodiments, the FO system is in fluid communication with and disposed downstream of the at least one RO system and configured for receiving a retentate stream from the at least one RO system. In one embodiment of the water treatment system, a permeate flow from the at least one FO system is directed to a separation system to obtain a product solvent and a concentrated draw solution. The product solvent can be directed to the at least one RO system. In some embodiments, the at least one FO system includes a combined forward osmosis membrane and electrodeionization membrane assembly. In yet another embodiment, the two stage clarifier further includes an electrocoagulation unit disposed in at least one of the first settling zone, the second settling zone, or the transition zone. The water treatment system can also include a filtration system in fluid communication with and disposed downstream of the two stage clarifier and/or an ion exchange system in fluid communication with and disposed downstream of the two stage clarifier.

In another aspect, the invention relates to a system for osmotic extraction of a solvent from a first solution. The system includes a forward osmosis system, a pretreatment system, and a separation system. The forward osmosis system includes a first chamber having an inlet fluidly connected to a source of the first solution, a second chamber having an inlet fluidly connected to a source of a concentrated draw solution, and a semi-permeable membrane system separating the first chamber from the second chamber. The pretreatment system is in fluid communication with the source of the first solution and the forward osmosis system. In one embodiment, the pretreatment system is disposed between the source of the first solution and the forward osmosis system. The separation system is fluidly connected downstream of the second chamber to recover at least one of draw solutes or a solvent stream. The separation system can include at least one of a distillation apparatus or a contact membrane, the separation system configured to receive a dilute draw solution from the second chamber.

In various embodiments, the concentrated draw solution includes ammonia and carbon dioxide in a desired molar ratio of greater than one to one; however, other draw solutions are contemplated and considered within the scope of the invention, such as sodium chloride. Additional draw solutions are described in PCT Publication No. WO2014/078415, the disclosure of which is hereby incorporated herein by reference in its entirety. The pretreatment system can include at least one of a heat source for preheating the first solution, means for adjusting the pH of the first solution, means for disinfection (e.g., chemical or UV), separation and clarification, a filter or other means for filtering the first solution (e.g., carbon or sand filtration, nanofiltration, or reverse osmosis), heat exchange, means for polymer addition, use of an anti-scalant, ion exchange, or means for softening (e.g., lime or soda ash softening) the first solution. The system can also include a post-treatment system in fluid communication with the solvent stream. The post-treatment system can include at least one of a reverse osmosis system, an ion exchange system, additional forward osmosis processes, a distillation system, a pervaporator, a mechanical vapor recompression system, a heat exchange system, or a filtration system. Post-treatment may reduce product water salinity below that produced by a single pass forward osmosis system. In other embodiments, post-treatment may alternatively or additionally be used to remove draw solutes that would otherwise be present in a product stream. In some non-limiting embodiments, forward osmosis brine discharge may be post-treated using ion exchange, distillation, pervaporation, membrane distillation, aeration, biological treatment or other process to remove draw solutes that reverse diffuse into brine. Additional post-treatment operations can include zero liquid discharge (ZLD) treatment using, for example, crystallization and evaporation. In one embodiment, the ZLD treatment uses a forward osmosis system, for example, in place of an evaporation system. In additional embodiments, the system can also include a recycling system including an absorber configured to facilitate reintroduction of the draw solutes to the second chamber to maintain the desired molar ratio of the draw solution.

In another aspect, the invention relates to a water treatment system that includes at least one softening system configured for receiving a raw feed of the water and a clarifier in fluid communication with the at least one softening system. The at least one softening system includes a bacterial softening system. In various embodiments, the bacterial softening system includes sulfate-reducing bacteria. The sulfate-reducing bacteria may reside in a reservoir (e.g., collected/disposed on the side walls of the reservoir), where the reservoir includes a conical shaped floor for collecting and removing solids precipitated out of the raw feed. The reservoir may also include means for removing hydrogen sulfide gas and means for stirring or agitating the raw feed within the reservoir. The at least one softening system can also include at least one of a lime softening system, a soda ash softening system, or a flocculation system. In one or more embodiments, the water treatment system includes at least one osmotically driven membrane system in fluid communication with and disposed downstream of the clarifier. The at least one osmotically driven membrane system can include one or more reverse osmosis units and/or one or more forward osmosis units.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

In accordance with one or more embodiments, an osmotic method for extracting a solvent (e.g., water) from a solution may generally involve exposing the solution to a first surface of a forward osmosis membrane. A second solution, or draw solution, with an increased concentration relative to that of the first or process solution may be exposed to a second opposed surface of the forward osmosis membrane. Solvent may then be drawn from the solution through the forward osmosis membrane and into the second solution generating a solvent-enriched solution via forward osmosis that utilizes fluid transfer properties involving movement from a less concentrated solution to a more concentrated solution. The solvent-enriched solution, also referred to as a dilute draw solution, may be collected at a first outlet and undergo a further separation process to produce, for example, purified water. A second product stream, e.g., a depleted or concentrated process solution, may be collected at a second outlet for discharge or further treatment.

Hydraulic pressure may generally promote transport of the first and second solutions through a membrane module along a longitudinal axis of their respective channels, while osmotic pressure may generally promote transport of solvent across a forward osmosis membrane in the module from the feed to the draw solution. Alternatively, hydraulic pressure may be exerted on the feed solution to assist the flow of solvent from the feed to draw solutions, or hydraulic pressure may be placed on the draw solution to allow the production of power from the expansion of the volume of the draw solution due to membrane flux of solvent from the feed solution driven by the osmotic pressure difference between the two solutions (PRO). Generally, flow channels within the module are designed to minimize the hydraulic pressure necessary to cause flow through these channels (cross-flow), but this is often at odds with the desire to create turbulence in the flow channels, beneficial for efficient generation of osmotic pressure difference between the two solutions, which has a tendency to increase resistance to flow. Higher osmotic pressure differences may generally increase transmembrane flux, but may also have a tendency to increase the amount of heat required to separate the draw solutes from the dilute draw solution for production of a dilute water product and a re-concentrated draw solution.

In accordance with one or more embodiments, a forward osmosis membrane module may include one or more forward osmosis membranes. The forward osmosis membranes may generally be semi-permeable, for example, allowing the passage of water, but excluding dissolved solutes therein, such as sodium chloride, ammonium carbonate, ammonium bicarbonate, and ammonium carbamate. Many types of semi-permeable membranes are suitable for this purpose provided that they are capable of allowing the passage of water (i.e., the solvent) while blocking the passage of the solutes and not reacting with the solutes in the solution. The membrane can have a variety of configurations including thin films, hollow fiber membranes, spiral wound membranes, monofilaments and disk tubes. There are numerous well-known, commercially available semi-permeable membranes that are characterized by having pores small enough to allow water to pass while screening out solute molecules such as sodium chloride and their ionic molecular species such as chloride.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

In accordance with one or more embodiments, the first solution may be any aqueous solution or solvent containing one or more solutes for which separation, purification or other treatment is desired. In some embodiments, the first solution may be non-potable water, such as seawater, salt water, brackish water, gray water, and some industrial water. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc. In some examples, the first solution may be brine, such as salt water or seawater, wastewater or other contaminated water. The first solution may be delivered to a forward osmosis membrane treatment system from an upstream unit operation such as an industrial facility, or any other source such as the ocean. The second solution may be a draw solution containing a higher concentration of solute relative to the first solution. A wide variety of draw solutions may be used. For example, the draw solution may comprise a thermolytic salt solution. In some embodiments, an ammonia and carbon dioxide draw solution may be used, such as those disclosed in U.S. Patent Publication No. 2005/0145568, to McGinnis, the disclosure of which is hereby incorporated herein by reference in its entirety. In one embodiment, the second solution may be a concentrated solution of ammonia and carbon dioxide. In at least one embodiment, the draw solution may comprise ammonia and carbon dioxide in a molar ratio of greater than 1 to 1.

In accordance with one or more additional embodiments, forward osmosis systems and methods may be integrated with auxiliary processes for maximizing water recovery from wastewater sources with potential for scale precipitation. For example, to prevent precipitation of calcium and magnesium salts, calcium and magnesium may first be removed from the feed via techniques such as those involving ion exchange with sodium or strong acid cation exchange resin. The FO concentrate may be used for regenerating the resin. A chemical dispersant may be used to prevent precipitation within the ion exchange column. For silica scale control, a silica scale dispersant may be fed to the feed of the system. If the desired concentration factor leads to a concentration of silica that exceeds the maximum recommended by the dispersant supplier, a portion of the feed may be recycled through a small external microfilter or ultrafilter that removes silica.

Figure 1:
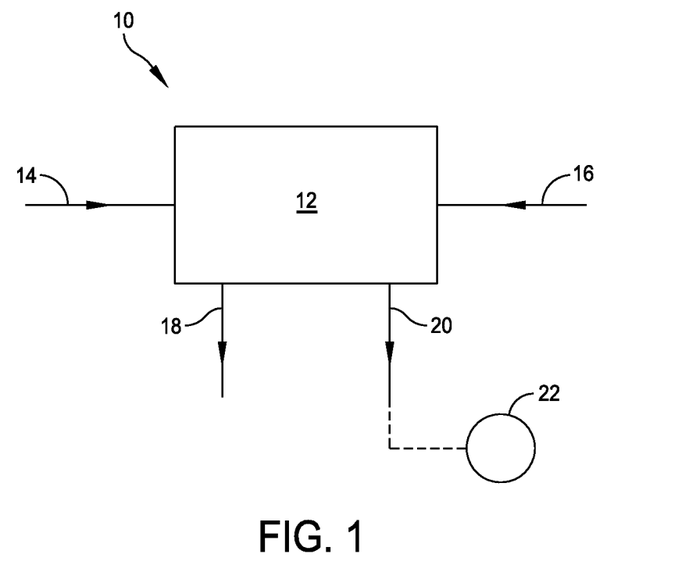
FIG. 1 is a schematic representation of a forward osmosis system/process for wastewater treatment in accordance with one or more embodiments of the invention.

FIG. 1 presents a schematic of a forward osmosis system/process for wastewater treatment. A wastewater stream to be treated may contain one or more species such as salts, proteins, catalysts, microorganisms, organic or inorganic chemicals, chemical precursors or products, colloids, or other constituents. In some non-limiting embodiments, nutrient discharge by wastewater plants may be reduced with a forward osmosis system and process as illustrated. As shown in FIG. 1, the system/process 10 includes a forward osmosis module 12. Various forward osmosis systems and processes can be used, such as those described herein and further described in U.S. Pat. Nos. 6,391,205 and 8,753,514, U.S. Patent Publication Nos. 2011/0203994, 2012/0273417, 2012/0267306, 2012/0267307; and PCT Publication No. WO2014/124034; the disclosures of which are hereby incorporated herein by reference in their entireties. The module 12 is in fluid communication with a wastewater source or stream 14 (i.e., the feed solution) and a draw solution source or stream 16. The wastewater source 14 can include, for example, municipal (e.g., sewage) and/or industrial (e.g., hydraulic fracturing flowback) wastewater, including radioactive water. The draw solution source 16 can include, for example, a saline stream, such as sea water, or another solution as described herein that can act as an osmotic agent to dewater the wastewater source 14 by osmosis through a forward osmosis membrane within the module 12. The module 12 outputs a stream 18 of concentrated solution from the wastewater source 14 that can be further processed as described herein. The module 12 also outputs a dilute draw solution 20 that can be further processed as described herein. For example, the dilute draw solution 20 can be directed to a separation unit 22 where draw solutes and a target solvent can be recovered.

In accordance with one or more embodiments, draw solutes may be recovered for reuse. Examples of draw solute recovery processes are described in U.S. Patent Publication No. 2012/0067819, the disclosure of which is hereby incorporated herein by reference in its entirety. A separation system may strip solutes from dilute draw solution to produce product water substantially free of the solutes. The separation system may include a distillation apparatus, such as a distillation column or membrane device. Draw solutes may then be returned, such as by a recycle system, back to the concentrated draw solution. Gaseous solutes may be condensed or absorbed to form a concentrated draw solution. An absorber may use dilute draw solution as an absorbent. In other embodiments, product water may be used as an absorbent, for all or a portion of the absorbing of the gas streams from a solute recycle system. In addition, gas and/or heat produced as part of the waste water treatment process may be used in the draw solute recovery process.

Figure 2:
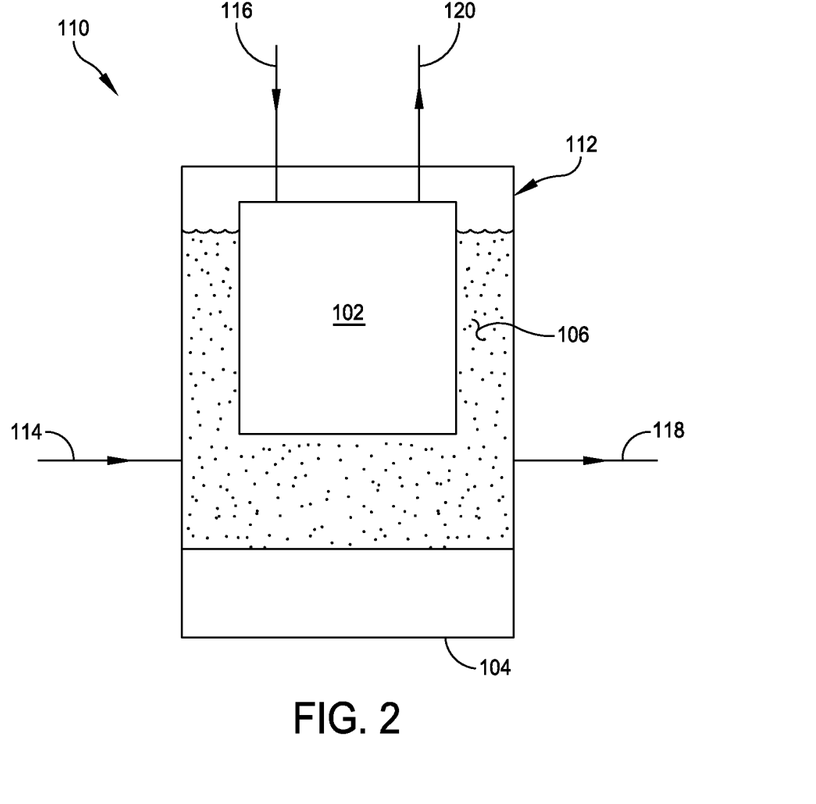
FIG. 2 is a schematic representation of an alternative system/process for the treatment of wastewater in accordance with one or more embodiments of the invention.

FIG. 2 depicts a system/process 110, where a forward osmosis membrane module 102 may be immersed or placed within an enclosed assembly. In addition to the methods described above for reducing fouling, the system/process 110 depicted in FIG. 2 utilizes a seeded slurry approach for treating a source of wastewater or other feed solution. As shown, the system/process 110 includes a forward osmosis module 112 in fluid communication with a wastewater stream 114 and a draw solution stream 116. The module 112 includes a chamber or tank 104 for receiving the wastewater. The chamber 104 is configured for holding the membrane module 102. As discussed with respect to FIG. 1, the FO module 112 also outputs a concentrated solution 118 and a dilute draw solution 120.

Figure 3:
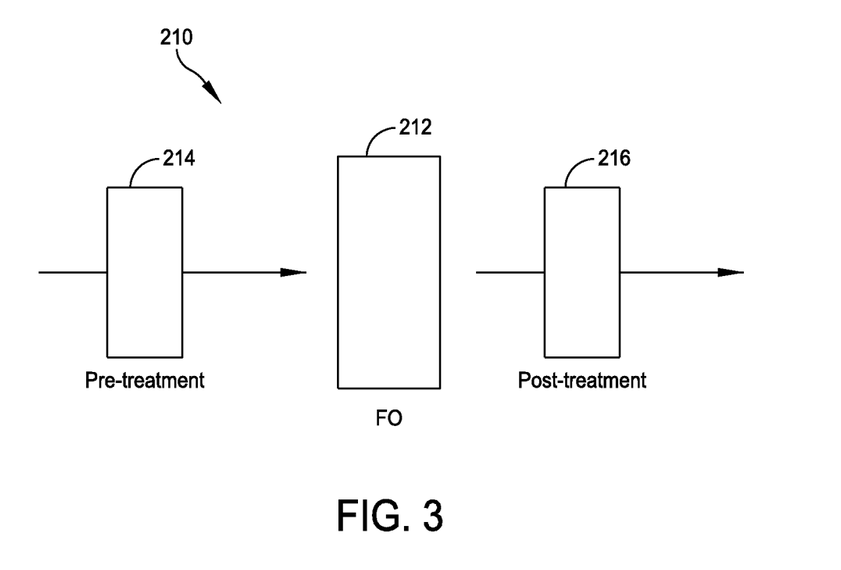
FIG. 3 is a schematic diagram of a system for osmotic extraction of a solvent in accordance with one or more embodiments of the invention.

FIG. 3 presents a schematic of a system 210 for osmotic extraction of a solvent using a forward osmosis system/process 212 including one or more pretreatment and/or post-treatment unit operations 214, 216. Various forward osmosis systems and processes can be used, such as those previously incorporated herein. In accordance with one or more embodiments, the system 210 may include one or more pretreatment operations 214 to enhance the forward osmosis process 212. Pretreatment may involve pH adjustment, such as elevating pH levels of a process stream to be treated, use of an anti-scalant, various types of filtration, polymer addition, heat exchange, softening, flocculation, clarification, and nanofiltration softening.

In accordance with one or more embodiments, the system 210 may include one or more post-treatment operations 216. Post-treatment may involve second pass reverse osmosis separation, ion exchange separation, additional forward osmosis processes, or other ammonia and/or salt removal operations. Post-treatment may reduce product water salinity below that produced by a single pass forward osmosis system. In other embodiments, post-treatment may alternatively or additionally be used to remove draw solutes that would otherwise be present in a product stream. In some non-limiting embodiments, forward osmosis brine discharge may be post-treated using ion exchange, distillation, pervaporation, membrane distillation, aeration, biological treatment or other process to remove draw solutes that reverse diffuse into the brine. Additional post-treatment operations can include zero liquid discharge (ZLD) treatment using, for example, crystallization and evaporation. In one embodiment, the ZLD treatment uses a forward osmosis system, for example, in place of an evaporation system.

Figure 4:
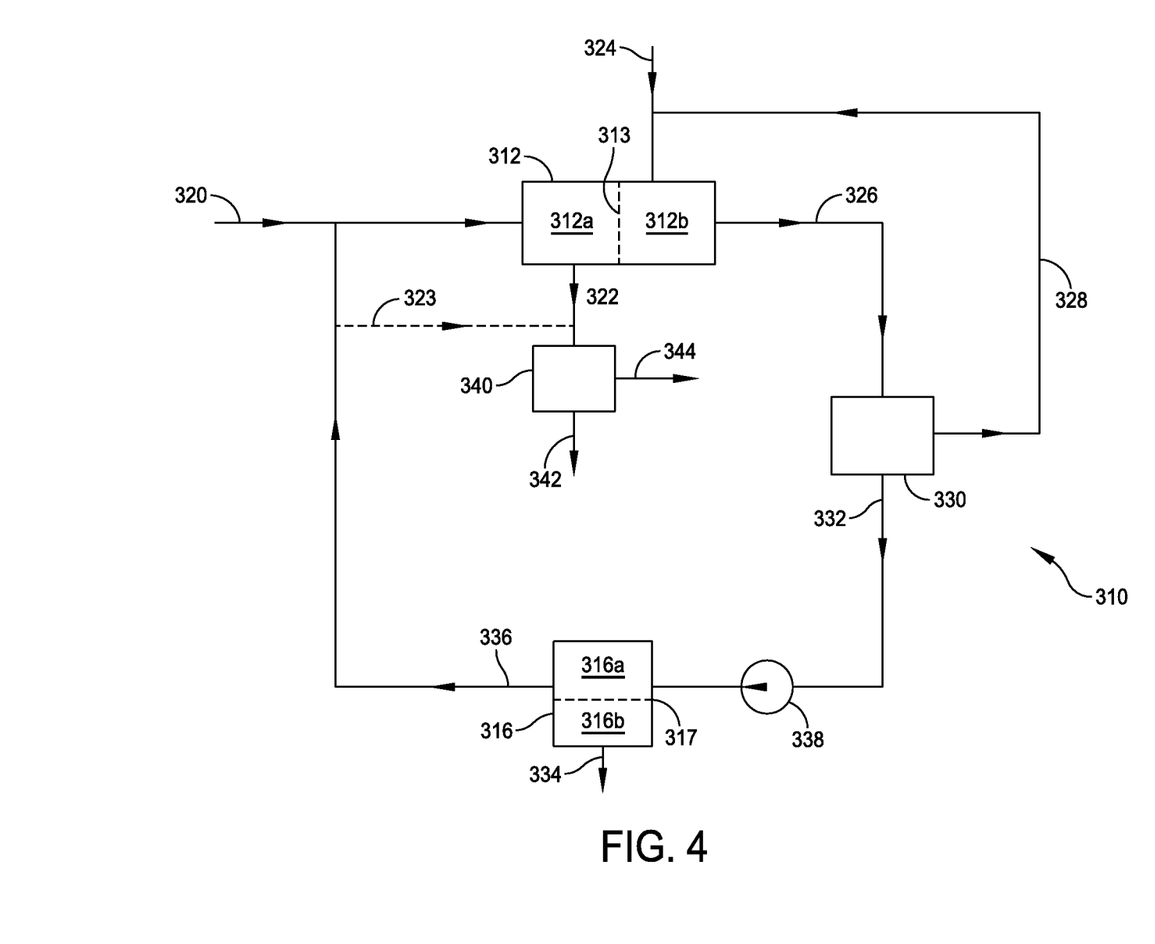
FIG. 4 is schematic representation of another application of the system of FIG. 3 in accordance with one or more embodiments of the invention.

FIG. 4 represents a possible application of the system of FIG. 3 using a reverse osmosis unit to post-treat the purified water discharged by a separation/recycling unit and redirecting the concentrate from the reverse osmosis system to a feed of the forward osmosis system. As shown in FIG. 4, the system 310 includes the forward osmosis unit 312, which includes one or more first chambers 312a that contain or are in fluid communication with a source of a feed or first solution 320. The forward osmosis unit 312 also includes one or more second chambers 312b that are separated from the first chamber(s) 312a by a semi-permeable forward osmosis membrane 313. The second chamber(s) 312b either contain or are in fluid communication with a source of concentrated draw solution 324. The concentrated draw solution 324 has a solute concentration sufficient to maintain an osmotic concentration gradient across the membrane 313, thereby causing a solvent from the first/feed solution 320 to flux across the membrane 313 into the second chamber 312b and dilute the concentrated draw solution. The first solution 320 is concentrated in the first chamber 312a, forming a second solution 322. The dilute draw solution 326 is directed to a separation and/or recycling system 330, where the dilute draw solution 326 is separated into draw solutes (or a concentrated draw solution) 328 and the solvent (e.g., potable water) obtained via the forward osmosis process. In one or more embodiments, the separation/recycling system 330 uses waste heat to remove the ammonia and carbon dioxide solutes from the dilute draw solution.

The recovered solvent 332, which might normally be considered a final product, is directed to a reverse osmosis system 316. Typically, the solvent 332 will be pressurized and transferred to the reverse osmosis system 316 via a pressure exchange device, such as a pump 338. The solvent 332 is transferred to a first chamber/side 316a of the reverse osmosis system 316 under pressure, thereby forcing solvent through the reverse osmosis membrane 317 and resulting in a purified solvent 334 on the second chamber/side 316b of the membrane 317. The purified solvent 334 can be collected for any intended purpose. Remaining under pressure in the first chamber/side 316a of the membrane 317 is the concentrated solution. This concentrated solution 336 can be directed to the forward osmosis system 312. In particular, the concentrated solution 336 is added to the feed/first solution 320 and introduced therewith to the first chamber/side 312a of the system 312/membrane 313. In alternative embodiments, the concentrated solution 336 is not returned directly to the forward osmosis unit 312/first solution 320, but is transferred directly to the second separation system 340, as shown by dashed line 323, in which case the concentrated solution 336 is mixed with the second solution or brine concentrate. This may be particularly beneficial in cases where the concentrated solution 336 has greater TDS, which can negatively impact operation of the forward osmosis unit 312 by, for example, decreasing the osmotic pressure in the system.

Figure 5:
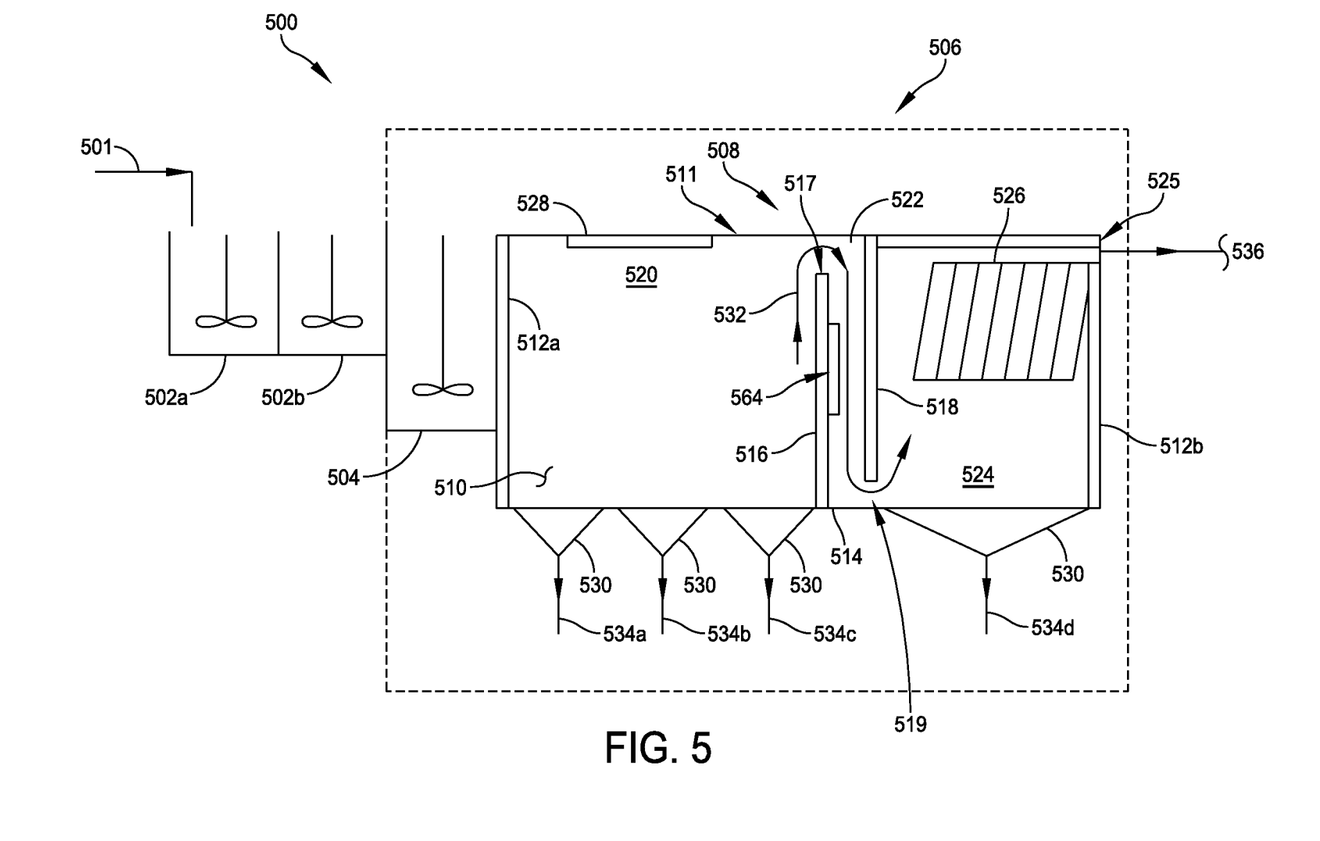
FIG. 5 is a schematic representation of a water treatment system in accordance with one or more embodiments of the invention.
Figure 6:
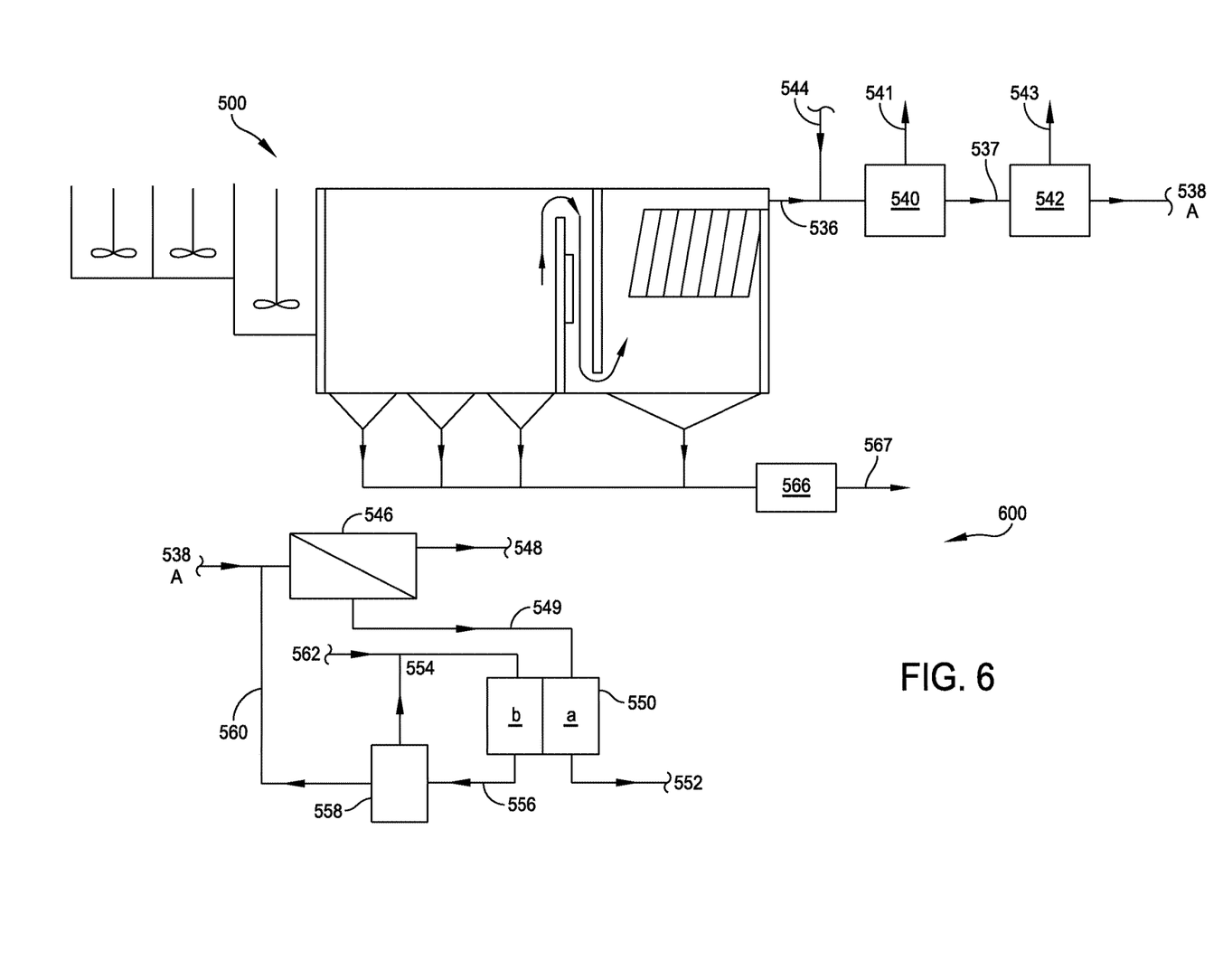
FIG. 6 is a schematic representation of a combination water treatment system incorporating the system of FIG. 5 in accordance with one or more embodiments of the invention.

FIG. 5 depicts one exemplary embodiment of a water treatment system 500. In some embodiments, the water treatment system is a stand-alone system, in other embodiments, it is part of a larger water treatment system incorporating other sub-systems, such as osmotically driven membrane systems, one embodiment of which is shown in FIG. 6. Generally, and as shown in FIG. 5, the system 500 includes one or more softening systems 502, a flocculation system 504, and a two-stage clarifier 506. The softening and flocculation systems 502, 504 are optional and can be included in any combination and order to suit a particular application and can include, for example, lime softening, soda ash softening, and polymer addition, as are conventionally known. Generally, a source of feed water 501 is introduced to the system 500 via one of the softening systems 502. The treated feed then passes to the next sub-system, either by gravity/overflow or pumped therebetween, eventually entering the two stage clarifier 506.

In one embodiment, the clarifier 506 has a generally rectangular shape; however, other shapes are contemplated and considered within the scope of the invention, such as circular, where the different stages (and/or other subsystems) are oriented radially relative to one another. As shown in FIG. 5, the clarifier 506 includes a tank or enclosure 508 that includes one or more side walls 510 (a single sidewall would be present in a circular tank, while two generally longitudinally extending walls would be included for a rectangular tank), two or more end walls 512, and a floor 514, all sealingly engaged and generally defining an open space therein. In some embodiments, one end wall 512a is common with one of the earlier sub-systems and can include a diffuser plate to allow the passing of the feed from the flocculation and/or softening system with minimal disturbance. In various embodiments, the floor 514 can be substantially planar, angled, or include one or more troughs 530 for collecting sludge or other matter settling out of the feed resident within the clarifier 506. The size, shape, number and orientation of the trough(s) will vary to suit a particular application. In one embodiment, the troughs are substantially pyramidal in shape with walls having an angle of repose of about 60 degrees. The troughs 530 can be arranged to cover substantially the entire floor 514.

In some embodiments, the clarifier 506 can include a cover 528 at least partially enclosing the tank 508. The cover 528 may extend across the entire width of the tank but not the entire length to allow access to the interior of the tank 508. In some embodiments, the cover 528 includes means (e.g., ports, valves, pumps, hoppers, metering devices, etc.) for introducing various chemicals or an energy source to the feed to, for example, change the pH of the feed, hasten the settling of contaminants, neutralize certain contaminants, or otherwise change the composition of the feed. The cover 528 can also help prevent the disturbance of the feed while in a settling zone, thereby making it harder for certain contaminants to stay in solution. The cover 528 may be removable and/or lockable and include hardware (e.g., hinges, hasps, etc.) to facilitate same and the easy access to the interior space of the clarifier 506.

The clarifier 506 also includes a first baffle 516 extending across the entire width of the tank 508 and extending upwardly from the floor 514 a substantial portion of the height of the side walls 510. The first baffle 516 and end wall 512a define a first settling zone 520 and its height is typically selected to influence residence time of the feed within the first settling zone 520 before allowing the at least partially clarified feed to over flow into the later stages or zones. In some embodiments, the first baffle 516 includes a weir 517 to further influence the transition of the clarified feed from the first settling zone 520. Generally, the height of the first baffle 516 and the dimensions of the first settling zone 520 will be selected to suit a particular application (e.g., feed composition, settling velocities of the contaminants, ambient conditions, etc.).

The clarifier 506 further includes a second baffle 518 that extends across the entire width of the tank 508 and extends downwardly from a top surface 511 of the side walls 510 a substantial portion of the height of the side walls 510 to define an opening 519 between the floor 514 and second baffle 518. The second baffle 518 and the second end wall 512b define a second settling zone 524, while the first baffle 516 and the second baffle 518 define a transitional zone 522 therebetween. Generally, the second baffle 518/opening 519 is sized to allow for a controlled flow of the feed from the transitional zone 522 to the second settling zone 524 to allow for continued settling of any contaminants within the feed. Generally, the larger the opening, the less turbulence and vice-versa. In some cases it is desirable to minimize the turbulence to hasten settling of solids (for example, magnesium hydroxide and silica); however, in some cases it is desirable to create turbulence to destabilize certain contaminants (for example, to promote aggregation and precipitation of certain particulates, such as calcium carbonate, various organics). In some embodiments, the clarifier 506, in particular the second settling zone or stage 524 of the clarifier 506, includes a plate pack (e.g., lamella plates) 526 disposed therein to further assist with the settling of any contaminants within the feed. Generally, the plate pack 526 will extend substantially the entire length and width of the second settling zone 524 to prevent any contaminants from short-circuiting the plates 526. In some embodiments, the plate pack 526 resides within the top 30% to 50% of the second settling zone 524. Similar to the first settling zone 520, the size of the second settling zone 524 and the transition zone 522 will be selected to suit a particular application. In some embodiments, the clarifier 506 includes an electrocoagulation plate 564 disposed therein to assist in the treatment of the feed water. As shown in FIG. 5, the plate 564 is disposed within the transition zone 522 and secured to one of the baffles 516, 518; however, the plate 564 can be disposed in any one of or all of the different zones within the clarifier 506 to suit a particular application.

As previously discussed, the overall dimensions of the clarifier 506 and the zones 520, 522, 524 defined therein will vary to suit a particular application, for example, flow rate, volume, necessary dwell time based on the composition of the feed and/or the ability to introduce additional chemicals/energy to the feed to hasten precipitation, settling, etc. and the need for the lamella plates. In one example, the feed 501 introduced to the system 500 includes calcium, magnesium, iron, manganese and various other organic substances, which after the initial softening and/or flocculation passes various carbonates (e.g., barium carbonate, strontium carbonate, calcium, carbonate) and certain organics, amongst other elements, to the clarifier 506, where the carbonates tend to settle out relatively quickly into the troughs 530, which include means 534 (e.g., ports, valves, pumps, etc.) to remove this sludge from the first zone or stage 520 of the clarifier 506. In various embodiments, the sludge is pumped to a filter press (566 in FIG. 6) for further processing. In some cases, lighter contaminants, such as magnesium hydroxide, do not settle quickly enough, thereby requiring the use of additional clarifiers, settling tanks, or longer dwell times, which result in increased costs, a larger system footprint, and a less efficient system. In some known systems, a single clarifier is used with a plate pack included therein; however, this arrangement is not desirable, especially where the feed includes a variety of contaminants as many of these contaminants (especially the larger ones that might otherwise settle quickly) will foul the plate pack not allowing for the passage of the clarified feed.

During operation, the partially clarified feed containing the contaminants that did not settle out within the allotted dwell time in the first settling zone 520 will spill over the first baffle 516 (arrow 532) and into the transition zone 522, where additional settling/treatment may occur as the feed passes through the opening 519 and into the second settling zone 524. In some embodiments, the weir 517 is disposed adjacent to a top surface of the first baffle 516 so as to at least partially regulate the overflow of the partially clarified feed into the transition zone 522. Once the feed has entered the second settling zone 524, the remaining contaminants will continue to settle out of the feed as the volume within the zone 524 rises. However, in some cases, not all of the contaminants will have settled out of the feed before leaving the second settling zone 524. In such cases, the plate pack 526 can be incorporated into the second settling zone 524 to further assist in the settling of the lighter contaminants. In some cases, the second settling zone 524 operates as a modified clearwell. Generally, as the lighter contaminants contact the plates, they then fall out of the solution and eventually end up in the trough 530d, where they can be removed as previously described. Because these lighter contaminants also tend to be smaller in size, the passageways between the plates will not get clogged/blocked and the clarified feed 536 will pass therethrough. The clarified feed 536 will eventually pass through the plate pack 526 and out of the clarifier 506, either via overflow/gravity or pumped from the clarifier to another treatment system. Generally, the plates within the plate pack 526 have an angle of inclination of about 45 degrees to about 80 degrees, preferably about 60 degrees to 70 degrees. In some embodiments, the clarifier 506 includes a weir 525 to regulate the exit of the clarified feed 536 from the clarifier 506. In some embodiments, the clarifier is configured on a trailer and/or the entire assembly (e.g., clarifier, softening systems, etc.) is disposed within a common housing/skid. In some embodiments, the treatment system 500 is mobile and can be deployed as and where needed.

In alternative embodiments, one of the chemical softening stages 502 can be replaced or the overall softening process supplemented with one or more bacterial softening stages. Generally, the various feed streams that can be processed by the system 500 include a variety of solutes/contaminants, for example, ions such as sulfates that tend to cause membrane scaling. Typically, pretreatment, such as chemical softening or feed acidification, is used to precipitate the solutes out of the feed. These precipitated solutes can then be removed from the system. These various chemical pretreatment processes can be costly as the chemicals need to be continuously replenished.

In one or more embodiments, the bacterial softening stage uses sulfate-reducing bacteria (SRB), such as *Desulfovibrio vulgaris*; however, SRB are a large family of anaerobic bacteria that obtain energy by reducing sulfate to hydrogen sulfide and there are numerous SRB that can be used in the present invention. Generally, a conventional chemical softening system (e.g., lime softening) can be replaced by an anaerobic bioreactor type system. The system includes a reservoir into which the raw feed water is introduced. The reservoir contains the SRB, typically resident on the side walls of the reservoir, which react with the sulfates present within the raw feed. Essentially, the SRB feed on the sulfates, oxidizing organic compounds or molecular hydrogen while reducing sulfates to hydrogen sulfide gas and producing metal sulfides (e.g., FeS) that will precipitate out of the feed. Generally, the hydrogen sulfide is a strong reducing agent, so it will react with heavy metals present within the raw feed to form insoluble compounds that will precipitate out of the feed. The SRB can also be used to reduce other substances as well, such as certain metals or hydrocarbons.

The reservoir will typically include a conical or pyramidal shaped bottom to assist in the collection and removal of the solids that precipitate out of the feed. In addition, the reservoir will typically have a cover arrangement that allows for the safe removal and recycling of the hydrogen sulfide, which is toxic and flammable. In most embodiments, the hydrogen sulfide is a waster product; however, in certain embodiments, the hydrogen sulfide gas could be processed for further use within the system 500. In addition, the reservoir should be made of a material compatible with the SRB (e.g., non-metallic). Typically, the bacterial softening system will be the first pretreatment process within the system and will include filtration on an output flow from the reservoir to the next pretreatment system. In some cases, the use of the bacterial softening system prior to the other softening systems allows for a reduced need for additional chemicals and lower costs. For example, the use of the bacterial softening system may also reduce the solubility of calcium within the raw feed, thereby reducing the need for soda ash in a later softening process.

FIG. 6 depicts an alternative water treatment system 600 that incorporates the system 500 of FIG. 5. As shown in FIG. 6, the system 600 includes the softening systems and clarifier assembly 500 of FIG. 5. In addition, the system 600 can include one or more of a filtration module (e.g., sand filtration or mixed media) 540, an ion exchange module 542, and one or more osmotically driven membrane systems 546, 550. The system 600 can also include means (e.g., ports, valves, pumps, or other metering devices) 544 for introducing different chemicals (e.g., an acid to alter pH) to the clarified feed 536 prior to the additional treatment. As shown in FIG. 6, the clarified feed 536 is directed to the filtration module 540 so as to remove additional contaminants from the feed that did not settle out of the feed within the clarifier 506. The captured contaminants can be discard or sent for further processing. In some embodiments, the filter module 540 is subjected to a back-flushing operation and the retained contaminants are returned to the initial feed 501 (arrow 541). The filtered feed 537 can then be directed to the ion exchange system 542 for further removal of, for example, calcium and magnesium. The ion exchange module 542 can be periodically recharged and the additional contaminants recovered can be returned to the initial feed 501 (arrow 543). The further processed feed 538 can now be directed to the one or more osmotically driven membrane systems 546, 550. Additionally, any of the sludge collected in the troughs 530 can be directed to the filter press 566 to recover additional water as previously mentioned. The contaminants retained by the filter press 566 can also be discarded or returned to the feed 501 (arrow 567).

As shown in FIG. 6, the feed 538 is directed to at least one reverse osmosis system (e.g., several RO systems could be supplied in parallel or series) under pressure (e.g., via a pump not shown) to produce product water 548. The retentate or partially concentrated feed 549 is directed the feed side (a) of at least one forward osmosis system 550 (e.g., several FO systems could be supplied in parallel or series). A concentrated draw solution 554 is introduced to the draw side (b) of the at least one FO system 550, where the draw solution 554 has a higher osmotic potential than the partially concentrated feed 549, thereby causing water to flux from the feed 549 across a membrane(s) disposed between the feed and draw sides and into the draw solution 554 creating a dilute draw solution 556 and a concentrated feed (e.g., brine) 552. The concentrated feed 552 can be discarded or sent for further processing. The dilute draw solution 556 is directed to a separation system 558 that removes the water from the dilute draw solution 556 to re-concentrate the draw solution 554. As shown in FIG. 6, the removed water 560 can be directed to the feed of the RO system 546 for further processing; however, the recovered water could be used as is or directed to alternative systems. In some embodiments, the system 600 may include a source of make-up draw solution 562 (e.g., via a brine maker and any combination of ports, valves, plumbing, etc.).

Figure 7:
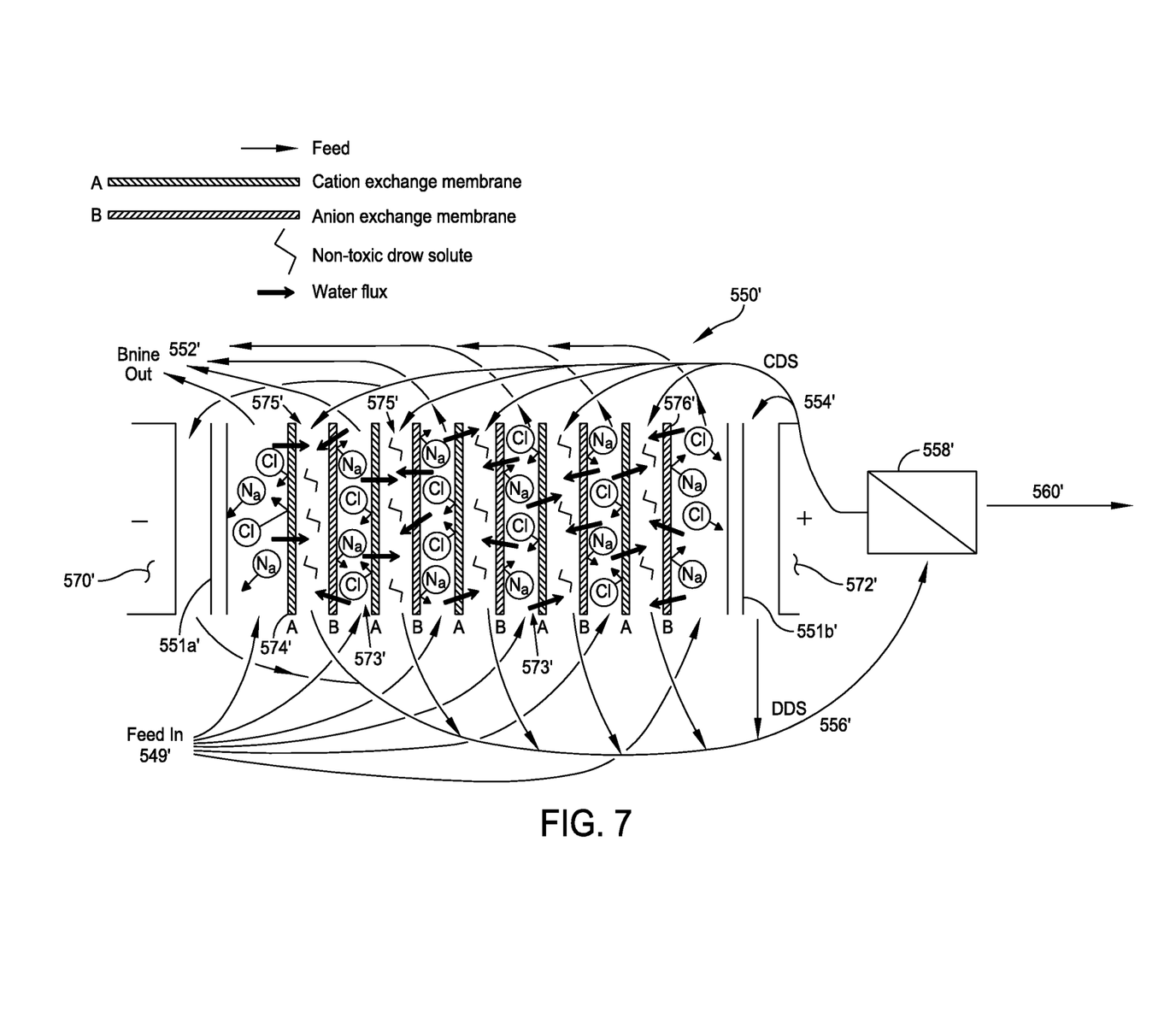
FIG. 7 is a schematic representation of an alternative osmotically driven membrane system for use in the water treatment systems and methods in accordance with one or more embodiments of the invention.

FIG. 7 depicts an alternative osmotically driven membrane system 550' that includes electrodeionization (EDI) capability. The system 550' as shown is a hybrid FO and EDI system that can be used in place of the FO system and/or RO system depicted in FIG. 6. In some embodiments, the system 550' is a stand-alone water treatment system (e.g., for desalination of low salinity, high hardness waters; ZLD applications, etc.). Generally, the EDI functionality of the system 550' will provide increased ion rejection over typical FO systems, while the FO functionality will allow the system 550' to treat higher salinity feeds than typical EDI systems.

As shown in FIG. 7, the system 550' includes a series of alternating cation and anion exchange membranes 574', 576' book-ended by a pair of FO membranes 551a', 551b' and an anode 570' at one end and a cathode 572' at the opposite end. The specific number and arrangement of cation and anion exchange membranes 574', 576' will vary to suit a particular application (e.g., flow rate, chemical composition of the feed, ambient conditions, etc.). In one or more embodiments, the various membranes are arranged in a plate and frame type assembly with the anode 570' and cathode 572' included in the end plates (or otherwise attached thereto); however, other configurations are contemplated and considered within the scope of the invention. Typically, the FO membranes 551' are spaced far enough from the anode and cathode, such that the anode 570' and cathode 572' remain essentially submerged within the solvent (e.g., water) that fluxes across the FO membranes 551', thereby preventing the build-up/contamination of the surfaces of the anode 570' and cathode 572' and extending their useful lives. As also shown in FIG. 7, the system can include a separation system 558' for separating the draw solution and product solvent 560', as previously described. In various embodiments, the separation system 558' includes one or more of an RO, ultra-filtration, micro-filtration, and/or nano-filtration membrane, with or without the use of thermal energy. In one embodiment, the separation system 558' utilizes cloud-point extraction to recover the draw solutes and product water.

In operation, a feed stream 549' (or 538' in certain embodiments) is introduced to the system 550' between feed channels 573' defined by alternating cation and anion exchange membranes 574', 576', while a concentrated draw solution 554' is introduced between alternate draw channels 575', also defined by the alternating cation and anion exchange membranes 574', 576'. In some embodiments, the membranes 574', 576' are standard cation and anion exchange membranes; however, in other embodiments, the membranes 574', 576' can be filtration type membranes (e.g., FO, nano-, ultra-, micro-) which can be treated (e.g., coated) to act as cation- and anion-like exchange membranes. Various compositions of draw solutions can be used for the concentrated draw solution 554', as long as the draw solution is non-ionic (i.e., has a net neutral charge) to prevent the passage of ions from the concentrated draw solution 554' to the feed 549'. In one or more embodiments, the concentrated draw solution 554' is a zwitterionic, polymeric draw solution. Returning to FIG. 7, a concentrated feed (e.g., brine) 552' exits the feed channels 573' within the system 550', while a diluted draw solution 556' exits the draw channels 575'. The diluted draw solution 556' is typically directed to the separation system 558' for recovery of the draw solutes and product solvent 560', as previously discussed. During operation, the higher osmotic pressure of the concentrated draw solution 554' tends to draw solvent across the various membranes 551', 574', 576' from the feed 549', which causes the concentration thereof. At the same time, various ions (e.g., Cl, Na, Ca, Br, etc.) present within the feed 549' are being drawn to either the anode 570' or cathode 572' (depending on their charge); however, due to the nature of the cation and anion exchange membranes 574', 576', the ions are prevented from leaving the feed stream 549' (e.g., via the disruption of the diffusion of the ions through the membranes 574', 576') and subsequently contaminating the product solvent 560' recovered from the diluted draw solution 556'. The ions trapped within the feed channels 573' are carried out of the system 550' in the concentrated feed 552', which can be discarded or sent for further treatment.

In accordance with one or more embodiments, the devices, systems and methods described herein may generally include a controller for adjusting or regulating at least one operating parameter of the device or a component of the systems, such as, but not limited to, actuating valves and pumps, as well as adjusting a property or characteristic of one or more fluid flow streams through a forward osmosis membrane module. A controller may be in electronic communication with at least one sensor configured to detect at least one operational parameter of the system, such as a concentration, flow rate, pH level, or temperature. The controller may be generally configured to generate a control signal to adjust one or more operational parameters in response to a signal generated by a sensor. For example, the controller can be configured to receive a representation of a condition, property, or state of any stream, component, or subsystem of the osmotically driven membrane systems and associated pre- and post-treatment systems. The controller typically includes an algorithm that facilitates generation of at least one output signal which is typically based on one or more of any of the representation and a target or desired value such as a set point. In accordance with one or more particular aspects, the controller can be configured to receive a representation of any measured property of any stream, and generate a control, drive or output signal to any of the system components, to reduce any deviation of the measured property from a target value.

In accordance with one or more embodiments, process control systems and methods may monitor various concentration levels, such as may be based on detected parameters including pH and conductivity. Process stream flow rates and tank levels may also be controlled. Temperature and pressure may be monitored. Membrane leaks may be detected using ion selective probes, pH meters, tank levels, and stream flow rates. Leaks may also be detected by pressurizing a draw solution side of a membrane with gas and using ultrasonic detectors and/or visual observation of leaks at a feedwater side. Other operational parameters and maintenance issues may be monitored. Various process efficiencies may be monitored, such as by measuring product water flow rate and quality, heat flow and electrical energy consumption. Cleaning protocols for biological fouling mitigation may be controlled such as by measuring flux decline as determined by flow rates of feed and draw solutions at specific points in a membrane system. A sensor on a brine stream may indicate when treatment is needed, such as with distillation, ion exchange, breakpoint chlorination or like protocols. This may be done with pH, ion selective probes, Fourier Transform Infrared Spectrometry (FTIR), or other means of sensing draw solute concentrations. A draw solution condition may be monitored and tracked for makeup addition and/or replacement of solutes. Likewise, product water quality may be monitored by conventional means or with a probe such as an ammonium or ammonia probe. FTIR may be implemented to detect species present providing information which may be useful, for example, to ensure proper plant operation, and for identifying behavior such as membrane ion exchange effects.

Forward osmosis may be paired with scale prevention pretreatments to allow high feedwater recovery including, for example, ion exchange, chemical softening, nano-filtration, anti-scalants, and/or precipitation techniques. Air scouring in a scaling prevention system for FO may be used to prevent scaling on a membrane surface. Forward osmosis may be used for organic containing waters without aeration for biological activity. A waste stream may be concentrated for potential use in a digester, while potentially producing methane within the membrane tank for energy use, and producing a product water of reuse quality. This may be particularly effective in an immersed membrane tank design. In addition to providing oxygen, air scouring may also be used to permit a high concentration of organics without membrane fouling. A batch or continuous stir tank reactor (CSTR) type operation may be implemented with forward osmosis, particularly to allow for enhanced function of organics concentrating forward osmosis and/or precipitating systems. Pressure retarded osmosis systems may also be in an immersed tank configuration. Pressure retarded osmosis systems may be aerated to prevent fouling and/or scaling and to reduce concentration polarization. Reactive gases may also assist in this functionality. Biological growth in forward osmosis systems may be controlled by alternating which membrane modules or sections of an array are exposed to high or low osmotic pressures. For example, a membrane array section which normally sees 0.5 M waters may be changed to the treatment of 2M waters. Such adjustment will make biofilm growth very difficult. Degassing of the feed stream may also be performed to prevent growth of certain types of biological organisms. For example, removing oxygen may restrict growth of nitrifying organisms that might oxidize ammonia passing from draw solution to feed solution. Sulphite reduction, biological treatment, osmotic shocks, conventional cleaning techniques which do not react with draw solution, product water flux without chemicals, brine solution aeration, and bisulfite addition are other techniques which may be implemented to restrict biological activity. In some embodiments, pH, ion probe, FTIR, and/or flow rates may be used to control forward osmosis systems to ensure desired fluxes, osmotic pressure differences, ratios of ammonia to carbon dioxide, and concentrations.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto; the invention may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:
1. A water treatment system comprising:
at least one softening system configured for receiving a raw feed of the water; and
a two-stage clarifier proximate to and in fluid communication with the at least one softening system, the two-stage clarifier comprising:
a generally rectangular enclosure comprising two longitudinal side walls, two end walls, and a floor extending therebetween and defining an open space therein;
a first baffle extending between the side walls and upwardly from the floor for a substantial portion of a height of the side walls, the first baffle sealingly engaged with the side walls and floor and with one end wall defining a first settling zone;
a second baffle extending between the side walls and downwardly from top edges thereof for a substantial portion of the height of the side walls, the second baffle disposed proximate to and spaced from the first baffle and defining a transition zone between the first baffle and the second baffle, a second settling zone between the second baffle and one of the end walls, and a passageway between the transition zone and the second settling zone proximate the floor; and
a lamella plate assembly disposed within the second settling zone, wherein the water treatment system further comprises at least one osmotically driven membrane system in fluid communication with and disposed downstream of the two stage clarifier, wherein the at least one osmotically driven membrane system comprises at least one forward osmosis system in fluid communication with and disposed downstream of at least one reverse osmosis system and configured for receiving a retentate stream from the at least one reverse osmosis system, and wherein the at least one forward osmosis system comprises a combined forward osmosis membrane and electrodeionization membrane.

2. The water treatment system of claim 1, wherein the floor comprises at least one trough for collecting sludge.

3. The water treatment system of claim 1, wherein the enclosure further comprises a cover extending between the side walls and over at least a portion of the open space.

4. The water treatment system of claim 1, wherein the at least one softening system comprises at least one of a lime softening system or a soda ash softening system.

5. The water treatment system of claim 1 further comprising a flocculation system disposed between the at least one softening system and the two stage clarifier.

6. The water treatment system of claim 1 further comprising means for introducing at least one of a chemical additive or an energy source to at least one of the first settling zone, the second settling zone, or the transition zone.

7. The water treatment system of claim 3, wherein introduction means are disposed in the cover.

8. The water treatment system of claim 1, wherein the at least one osmotically driven membrane system further comprises at least one reverse osmosis unit.

9. The water treatment system of claim 1, wherein a permeate flow from the at least one forward osmosis system is directed to a separation system to obtain a product solvent and a concentrated draw solution.

10. The water treatment system of claim 9, wherein the product solvent is directed to the at least one reverse osmosis system.

11. The water treatment system of claim 1, wherein the two stage clarifier further comprises an electrocoagulation unit disposed in at least one of the first settling zone, the second settling zone, or the transition zone.

12. The water treatment system of claim 1 further comprising a filtration system in fluid communication with and disposed downstream of the two stage clarifier.

13. The water treatment system of claim 1 further comprising an ion exchange system in fluid communication with and disposed downstream of the two stage clarifier.

14. The water treatment system of claim 1, wherein the at least one softening system comprises a bacterial softening system.

15. The water treatment system of claim 14, wherein the bacterial softening system comprises sulfate-reducing bacteria.

16. The water treatment system of claim 15, wherein the bacterial softening system comprises a reservoir comprising means for removing hydrogen sulfide gas.

* * * * *